United States Patent
Raftis et al.

[11] Patent Number: 6,016,839
[45] Date of Patent: Jan. 25, 2000

[54] AIR DIFFUSER VALVE

[75] Inventors: Spiros G. Raftis; Michael J. Duer, both of Pittsburgh; Chris Mitchell; A. Thomas Abromaitis, both of Sewickley, all of Pa.

[73] Assignee: Red Valve Co., Inc., Carnegie, Pa.

[21] Appl. No.: 09/102,134

[22] Filed: Jun. 22, 1998

Related U.S. Application Data

[60] Provisional application No. 60/050,655, Jun. 24, 1997.

[51] Int. Cl.[7] .................................................. F16K 15/14
[52] U.S. Cl. .......................... 137/846; 137/883; 210/136
[58] Field of Search ................................... 137/846, 883; 210/136

[56] References Cited

U.S. PATENT DOCUMENTS

| | | | |
|---|---|---|---|
| 3,131,712 | 5/1964 | Risley et al. | 137/846 |
| 3,499,464 | 3/1970 | Williams et al. | 137/883 |
| 3,710,942 | 1/1973 | Rosenberg | 137/846 |
| 4,013,556 | 3/1977 | Evans | 210/136 |
| 4,100,940 | 7/1978 | Spears | 137/883 |
| 4,253,247 | 3/1981 | Bergstrom | 137/883 |
| 4,486,122 | 12/1984 | Arntyr et al. | 137/846 |
| 4,610,063 | 9/1986 | Steudler, Jr. | 137/883 |
| 5,352,356 | 10/1994 | Murphy | 210/136 |
| 5,727,593 | 3/1998 | Duer | 137/846 |

*Primary Examiner*—Denise L. Ferensic
*Assistant Examiner*—Joanne Y. Kim
*Attorney, Agent, or Firm*—Webb Ziesenheim Logsdon Orkin & Hanson, P.C.

[57] ABSTRACT

An air diffuser system contains a manifold and a plurality of elastomeric "duckbilled" check valves. The manifold is constructed from a conduit material and can be arranged in many different configurations. The valves are made from an elastomeric material, such as rubber, preventing the valves from being clogged with sludge, sediment, or other debris commonly found in waste treatment water. Additionally, the valves can be bored with predetermined orifice sizes, allowing the volume and pressure of escaping air to be determined prior to installation. To make installation of the valves easier, various types of coupling devices may be used to attach the valves to the manifold. Examples of coupling devices include restrictive orifices, "Y"-shaped conduits, and nipple conduits. Multiple valves can also be fabricated on a common cuff prior to installation.

20 Claims, 5 Drawing Sheets

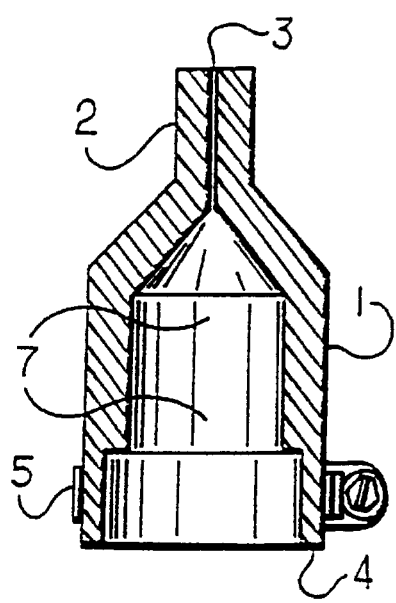
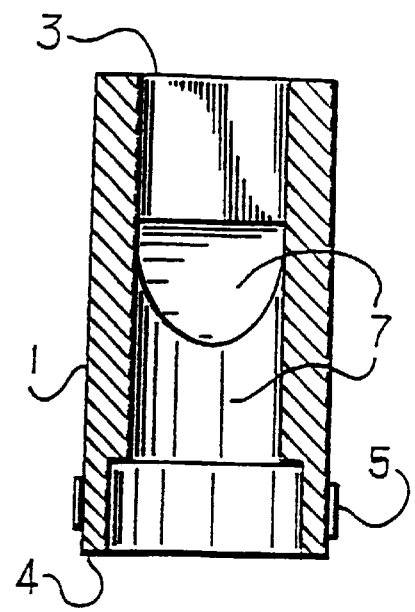
FIG. 3a      FIG. 3b
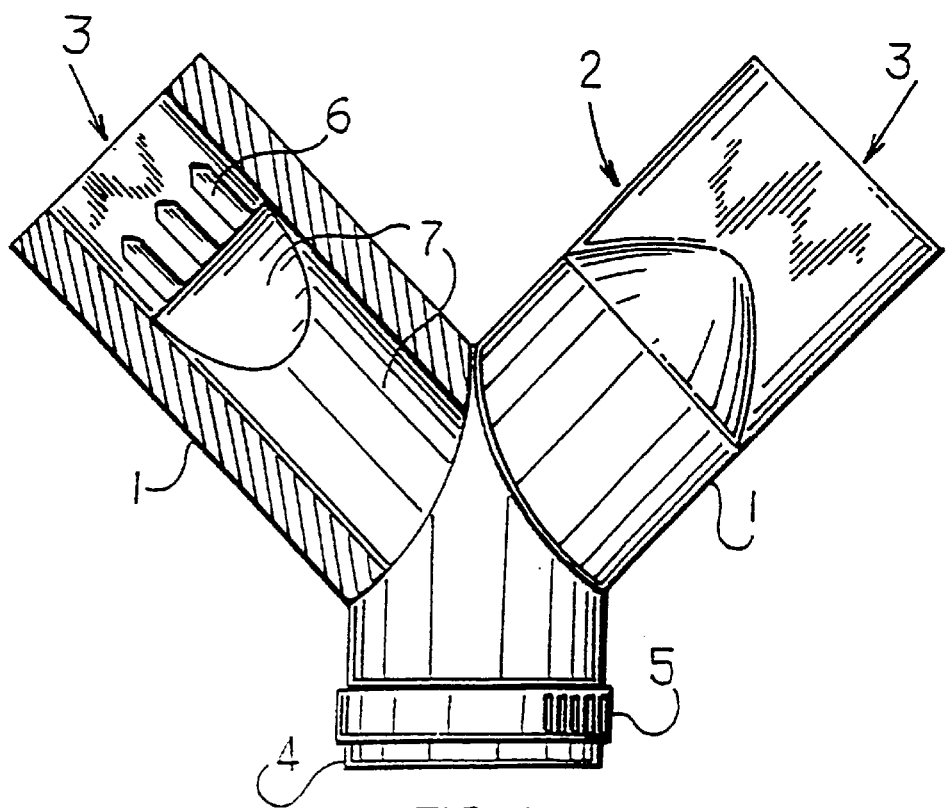
FIG. 4 ial application Ser. No. 60/050,655, filed Jun. 24, 1997.

AIR DIFFUSER VALVE

CROSS REFERENCE TO RELATED APPLICATION

This patent application claims the benefit of U.S. Provisional application Ser. No. 60/050,655, filed Jun. 24, 1997.

BACKGROUND OF THE INVENTION

1. Field of the Invention

The invention relates to a check valve of the so-called "duckbill" type for use in sewage treatment systems.

2. Description of the Prior Art

EPA directives and studies on aeration of sewage direct attention to the fact that one of the simplest, most inexpensive methods of cleaning up or partially cleaning sewage is to aerate it with either oxygen or air.

There are many plants worldwide that clean or partially clean sewage by aeration. There are many products to allow air into the process. Sewage is processed in a very large tank, known as an "aeration tank". At the bottom of this tank are many devices allowing air to float through sludge and sewage. One such device is a porous or perforated ceramic dome. A problem with this dome is that algae grows on the dome and blocks the holes.

There are many other companies that make a network of piping with valves that allow air to bubble through the system. When the air is shut off, the sludge must be prevented from backing in and plugging the holes. Therefore, a check valve is required. Generally speaking, the sludge and raw sewage in the aeration tank is 3 feet deep. In other cases, however, the sludge is 10 feet deep which requires larger, high volume check valves to overcome the head pressure.

The check valve should be maintenance free. Currently, there are many metal check valves on the market. However, the filthy sludge and sewage clogs, packs, jams, and generally makes the metal valves inoperative. An elastomeric check valve, constructed from a material such as rubber, would operate trouble free.

The customer wants to know the volume and pressure of the air being introduced into the sewage. It would be advantageous to provide the check valve with a predetermined orifice size and an arrangement to allow a very exact quantity of air into the system.

SUMMARY OF THE INVENTION

The present invention is a virtually maintenance free air diffuser system designed for sewage treatment applications. The preferred embodiment of the diffuser system comprises a manifold, a fluid inlet orifice, and elastomeric check valves attached to the manifold.

The manifold can take on an infinite number of shapes and may be constructed from most types or composition of conduit material, depending on the particular application. For example, the manifold may simply consist of one finite section of conduit arranged linearly or, alternatively, an infinite number of conduit pieces forming squares, circles, triangles, "H"-shapes, "L"-shapes, "I"-shapes, "U"-shapes, "E"-shapes, or any other conceivable arrangement. For sewage treatment applications, the shape of the manifold will probably be dictated by the shape of the reservoir.

The check valves are molded from an elastomeric material, such as rubber or reinforced rubber, eliminating the sedimentary clogs found in the prior art's metal valves.

Individual valves can be attached directly to the manifold or two or more valves can have their inlet ends fabricated on a common cuff before being attached to the manifold. The valves may also be attached to the manifold using any one of a wide range of intermediary coupling devices. For example, and without limitation, coupling devices may be restrictive orifices, "Y"-shaped conduits, or conduit nipples.

The check valves can also be bored with different size internal orifices, predictably controlling the volume and pressure of a released fluid. The orifices are bored longitudinally into the check valve's bill from inside the valve's main cavity.

It can be appreciated that any combination of conduit, valves, and intermediary coupling devices can be employed to obtain the desired results. For the purpose of example only, check valves containing internal orifices can be intermixed with valves having no internal holes, "Y"-shaped conduits can be used with check valves sharing a common cuff, and alternating valves can be fitted with restrictive orifices, etc.

Further details and advantages of the invention may be seen from the following detailed description, in conjunction with the accompanying drawings, wherein like reference numerals represent like parts.

BRIEF DESCRIPTION OF THE DRAWINGS

FIG. 3a is a cross-sectional view of an air diffuser valve according to a second embodiment of the invention;

FIG. 3b is a further cross-sectional view of the air diffuser valve of FIG. 3a;

FIG. 4 shows two air diffuser valves incorporated into a common cuff;

DETAILED DESCRIPTION OF THE PREFERRED EMBODIMENTS

This invention provides a new, improved type of air diffuser system. More specifically, this air diffuser system is ideal for aerating effluent in wastewater treatment plants as part of the wastewater purification process, commonly described as the "activated sludge" process. During this process, air is injected near the bottom of an aeration tank containing wastewater and bacterial floc. As the air rises to the surface, some of the oxygen in the air is transferred to the wastewater and is consumed by the bacteria during the digestion process.

There are many types of air diffusers currently in use but they all suffer from a common problem. They become plugged up with accumulated algae and sludge that settles on and in them.

The present invention provides an air diffuser system that uses many small, individual check valves (or "air diffuser valves") attached to a conduit manifold. The particular type of check valve 1, sometimes referred to as a "duckbill", can be made in many configurations and out of many materials. They can be made using various durometers of an elastomeric material, such as rubber or fabric reinforced rubber, depending on the stiffness required in any specific application. All other parameters being the same, if the check valve is made stiffer, less air will flow. If it is made softer, more air will flow. Likewise, all other parameters remaining the same, as the fluid manifold pressure increases, the flow rate of fluid exiting the bill end of each check valve also increases. Conversely, as the fluid manifold pressure decreases, the flow rate of fluid exiting the bill end of each check valve decreases.

Figure 1:
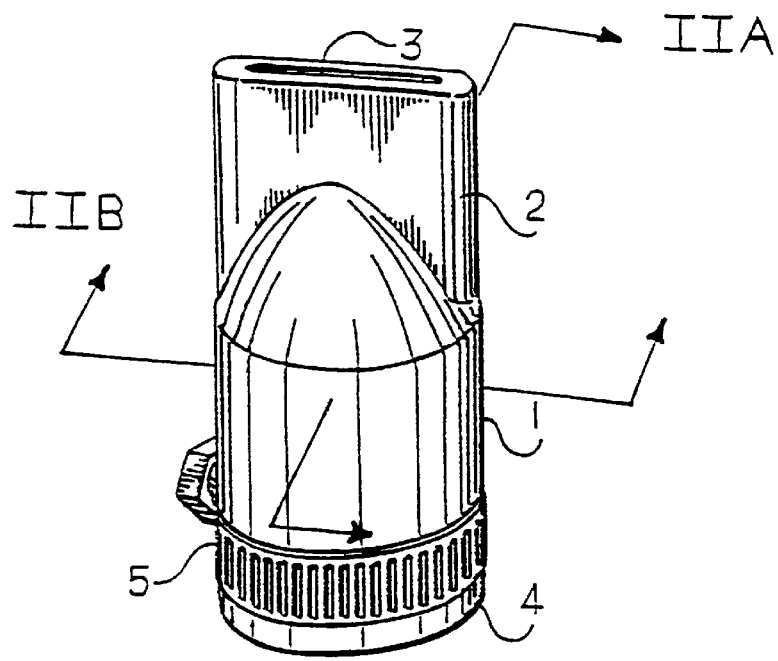
FIG. 1 is a perspective view of an air diffuser valve according to the invention.
Figures 2A, 2B:
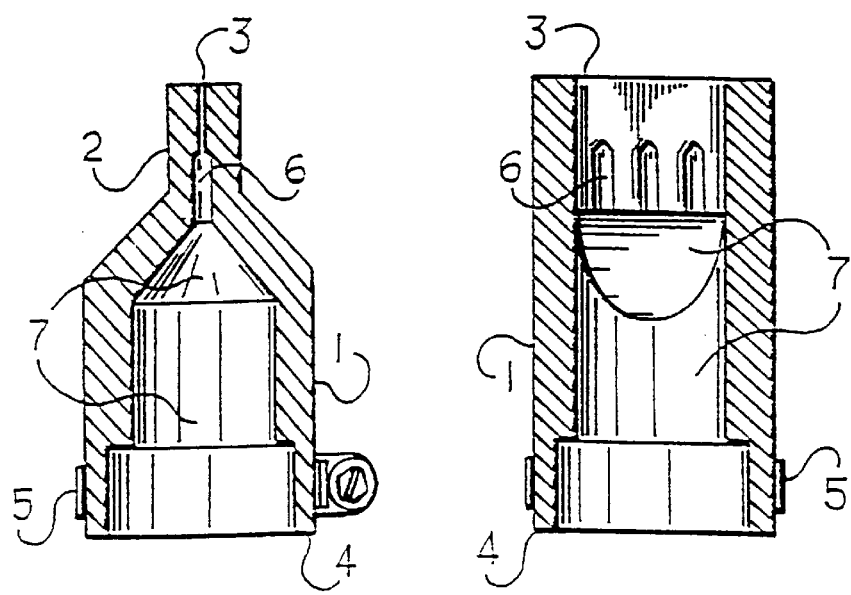
FIG. 2a is a cross-sectional view taken along line IIa—IIa of FIG. 1.
FIG. 2b is a cross-sectional view taken along line IIb—IIb of FIG. 1.

A preferred embodiment is shown in FIGS. 1, 2a and 2b. FIG. 1 shows the general external configuration of an individual check valve 1. The check valve has a cuff 4, which is inserted onto a segment of conduit or other suitable coupling device. Clamp 5 is then tightened over the cuff 4, holding the air diffuser valve 1 in place. A fluid, such as air, enters the check valve 1 through cuff 4, travels through the internal main cavity 7 and bill 2, and then exits through the bill slit 3. FIGS. 2a and 2b are sectional views that show the use of internal passages (holes) 6 to separate the air into individual streams and also control the amount of air discharged. With more holes, more air will flow. With fewer holes, less air will flow. The holes 6 may be drilled longitudinally into the bill 2 to provide a predetermined orifice size and allow a very exact, measured quantity of air to be introduced into the sewage.

By increasing the size of the holes 6, the amount of air discharged will be increased. Conversely, by decreasing the size of the holes, the amount of air discharged will be decreased. It should be understood that while three holes are shown as an example, more or fewer holes (even no holes, only a bill slit 3 as shown in section views 3a and 3b) could be used depending on the size of the check valve 1. This ability to optimize air flow, by selecting the size and quantity of holes 6, is in addition to being able to alter the overall stiffness of the check valve by using different durometers of an elastomeric material, such as rubber, adding or eliminating reinforcing plies, and modifying construction details.

Many other configurations can be made, using various coupling devices, without departing from the invention. One such alternate configuration is shown in FIG. 4, where two valves 1 are fabricated on a common cuff 4 to simplify installation. Of course, three, four, or more check valves 1 could be fabricated on a common cuff 4 to increase the number of check valves and thereby increase diffusion with a minimum of installation effort.

Figure 7:
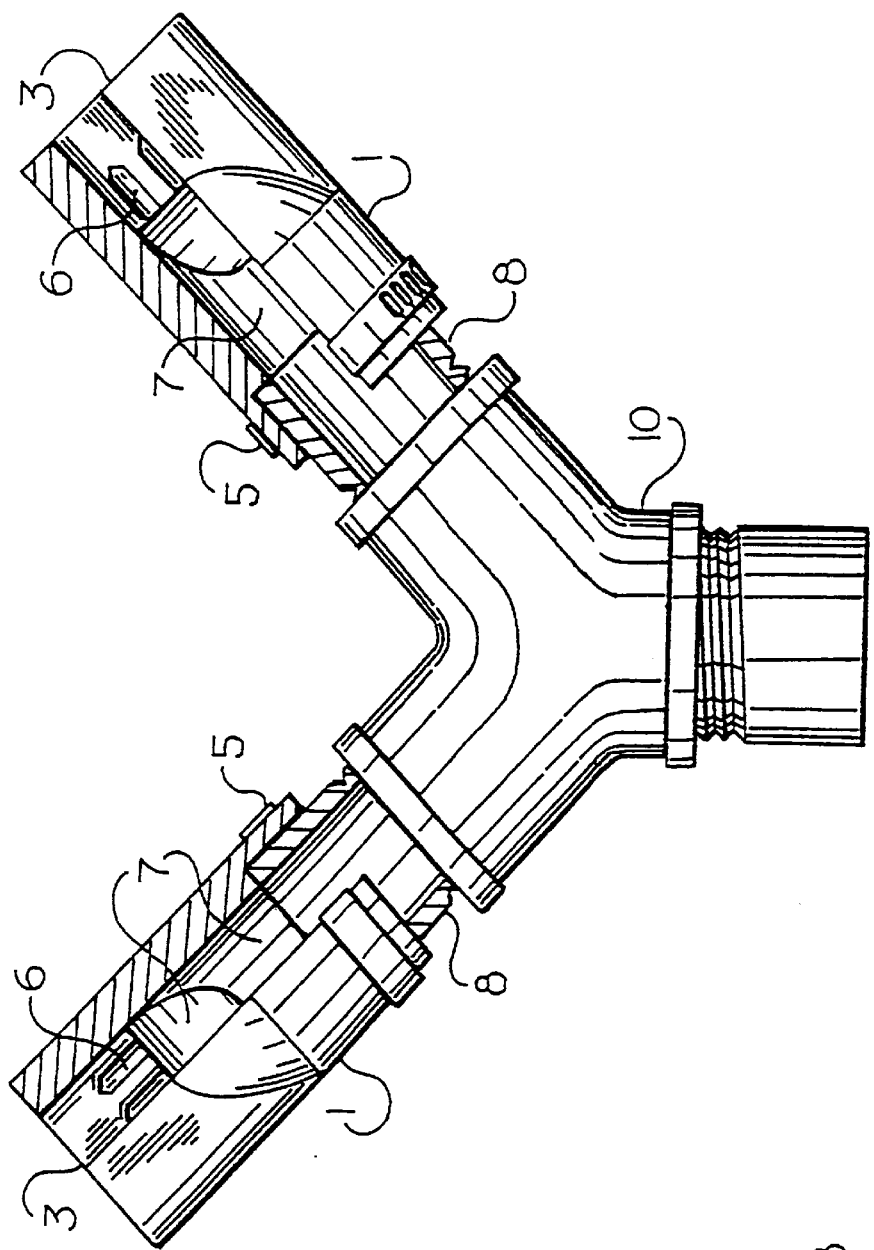
FIG. 7 shows two air diffuser valves attached to a threaded "Y" conduit.

Another alternate configuration is shown in FIG. 7, where two check valves 1 are installed on a common "Y"-shaped conduit 10 to simplify installation. Again, three, four, or more check valves could be installed on a multiple "tree" (not shown) or a "T"-shaped conduit (not shown) to increase the number of check valves and thereby increase diffusion with a minimum of installation effort. In this example, the "Y"-shaped conduit 10 is made from polyvinyl chloride (PVC) plastic and is threaded to allow convenient assembly to manifold 11.

Figure 5:
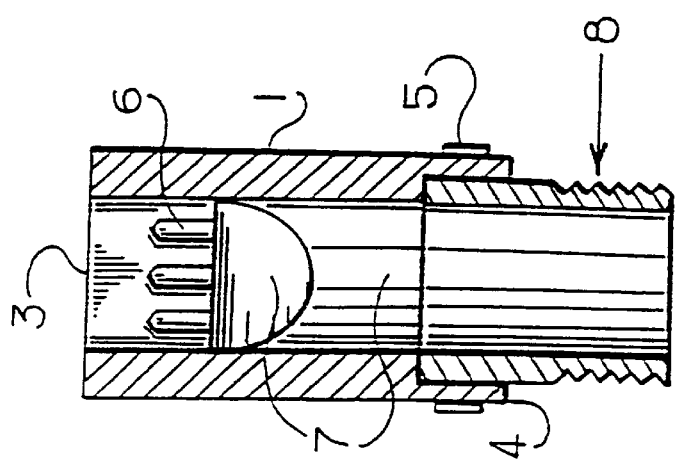
FIG. 5 is a cross-sectional view of an air diffuser valve with a pre-threaded nipple attached to the cuff.

Another configuration to simplify installation is shown in FIG. 5. Here the check valve 1 is preassembled to a PVC conduit nipple 8 to reduce installation time and effort.

Figure 6:
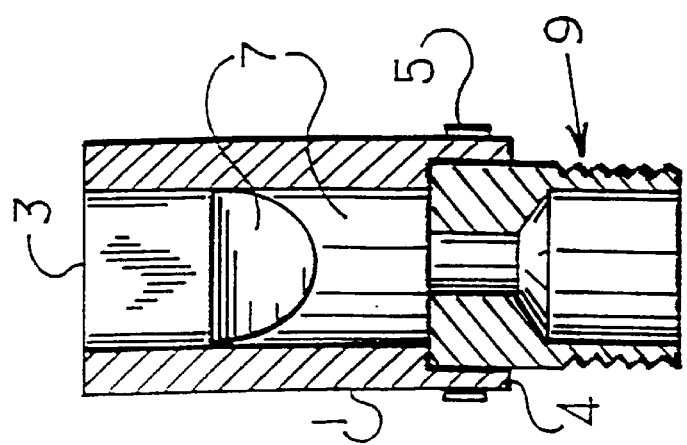
FIG. 6 shows the air diffuser of FIG. 1 with a threaded restrictive orifice attached to the cuff.

FIG. 6 shows the conduit nipple 8 replaced with a threaded restrictive orifice 9 in the general area of the cuff 4. This arrangement allows for adjusting fluid flow by reducing the amount of fluid entering the check valve.

Figure 8:
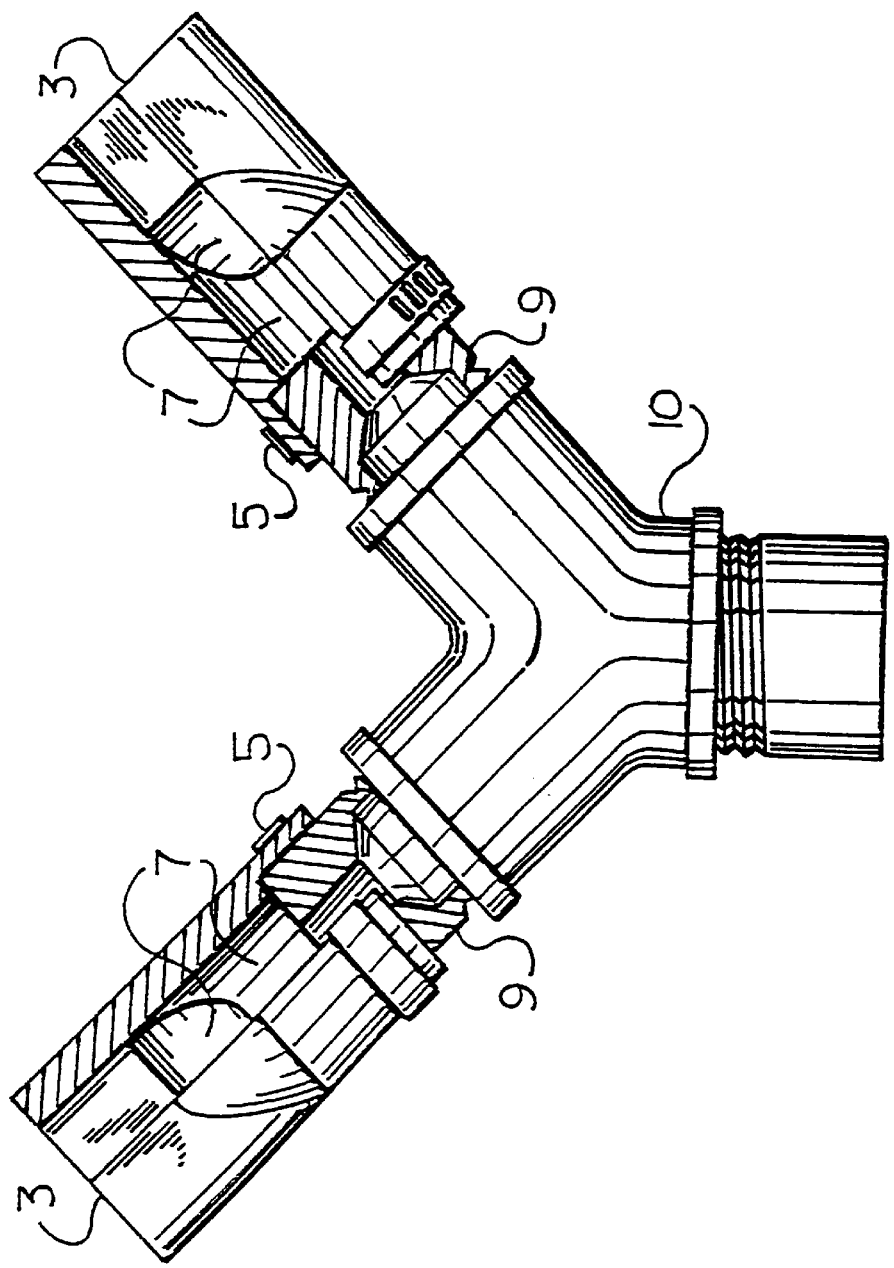
FIG. 8 shows two air diffuser valves, each having a threaded restrictive orifice and attached to a "Y" conduit; and, FIG. 9 is a typical manifold with multiple air diffuser valves attached.

As an alternate to the molded "Y"-shaped conduit coupling member shown in FIG. 4, check valves 1 as shown in FIGS. 5 and 6 can be preassembled to a PVC "Y"-shaped conduit 10 as shown in FIGS. 7 and 8, respectively.

The manifold 11 can be made of any suitable conduit material, preferably a corrosion resistant material such as polyvinyl chloride (PVC) plastic or stainless steel. The check valves 1 allow air to flow out of the manifold 11 and into the process, but prevent the backflow of sludge into the bill slit 3 and conduit manifold 11. This nonplugging feature saves substantial maintenance labor and thereby reduces operating costs by avoiding the need to drain the aeration tank to clean the diffuser system—a messy and time-consuming task.

Figure 9:
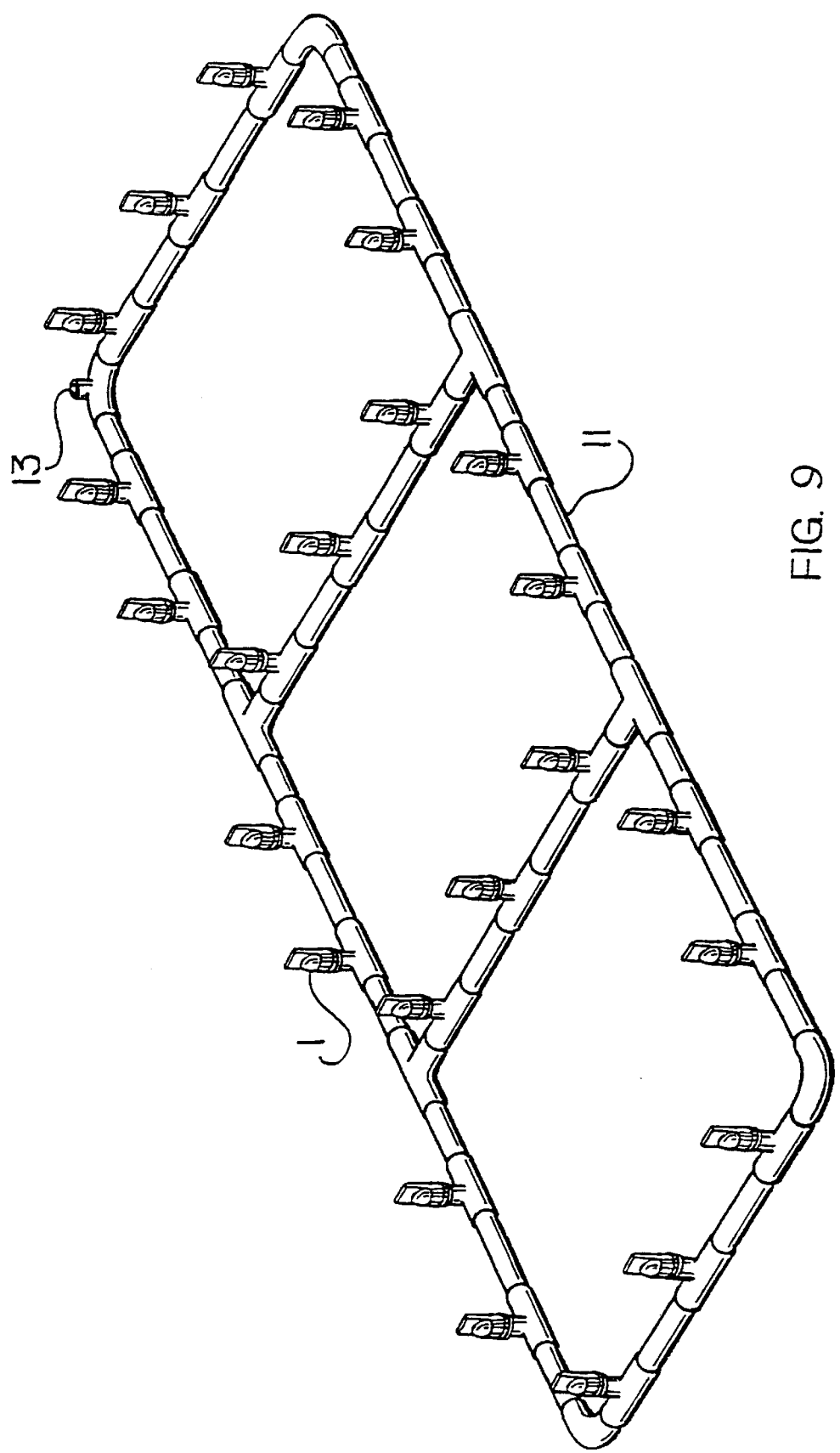

FIG. 9 shows a typical conduit manifold 11 using multiple check valves 1 as described by this invention. The manifold 11 can assume many other configurations by adding or subtracting conduit sections. The check valves 1, each molded from an elastomeric material such as rubber, are individually slipped over PVC nipples and held in place with stainless steel hose clamps 5. Any of these materials, of course, can be substituted with other suitable materials without departing from the invention. The cuff 4 may be replaced by a flange (not shown) as will be apparent to those skilled in the art. The entire manifold 11, with or without check valves, can be prefabricated in a convenient place and then lowered into the aeration tank. Only a single inlet fitting 13 needs to be on the conduit manifold 11 for admitting air to the manifold.

Although the check valves are shown pointing upward in this example, other orientations can also be used. For example, they can point down, horizontal, or any other suitable angle.

It should be understood that this invention is not limited to activated sludge applications but is useful anywhere it is desirable to inject and diffuse one process fluid (liquid, gas, powder, etc.) into another process fluid for the purpose of aeration, diffusion, agitation, or mixing.

It is not intended to limit the invention, except as set forth in the following claims.

We claim:

1. A diffuser system comprising:
   a manifold having a plurality of openings;
   a fluid inlet fitting on said manifold; and
   a plurality of elastomeric check valves, each valve having
      a molded body, said body having a fluid outlet bill end, a fluid inlet end, and a body wall forming an internal cavity extending from said fluid inlet end to said fluid outlet bill end, said fluid inlet end connected to a corresponding opening on said manifold;
   wherein a fluid enters each elastomeric check valve through its fluid inlet end and exits through its fluid outlet bill end, with an increasing flow rate of said fluid exiting said fluid outlet bill end as fluid manifold pressure increase and a decreasing flow rate of fluid exiting said fluid outlet bill end as fluid manifold pressure decreases.

2. The diffuser system of claim 1 further comprising at least one branch conduit connected to a corresponding opening on said manifold, said branch conduit having a plurality of openings, with an elastomeric check valve connected to each opening in said branch conduit.

3. The diffuser system of claim 1 further comprising a plurality of coupling devices, said devices each having at least one manifold end and at least one diffuser end, said manifold end connected to a corresponding opening on said manifold, said diffuser end connected to an inlet end of at least one elastomeric check valve.

4. The diffuser system of claim 3 wherein the coupler device is selected from a group consisting of a "Y"-shaped conduit, a restrictive orifice, and a conduit nipple.

5. The diffuser system of claim 1 wherein the elastomeric check valves are made of rubber.

6. The diffuser system of claim 1 wherein the elastomeric check valves are made of reinforced rubber.

7. The diffuser system of claim 1 wherein at least one elastomeric check valve has at least one internal orifice extending longitudinally from said internal cavity into said bill end.

8. The diffuser system of claim 1 wherein said fluid inlet ends are fabricated on a common cuff, said cuff connected to a corresponding opening on said manifold.

9. A diffuser system comprising:

a manifold having a plurality of openings;

a fluid inlet fitting on said manifold;

a plurality of coupling devices, said devices each having at least one manifold end and at least one diffuser end, wherein said manifold end is connected to a corresponding opening on said manifold; and a plurality of elastomeric check valves, each valve having a molded body, said body having a fluid outlet bill end, a fluid inlet end, and a body wall forming an internal cavity extending from said fluid inlet end to said fluid outlet bill end, said fluid inlet end connected to a diffuser end on one of said coupling devices;

wherein a fluid enters each elastomeric check valve through its fluid inlet end and exits through its fluid outlet bill end, with an increasing flow rate of said fluid exiting said fluid outlet bill end as fluid manifold pressure increases and a decreasing flow rate of fluid exiting said fluid outlet bill end as fluid manifold pressure decreases.

10. The diffuser system of claim 9 wherein said fluid inlet ends of said elastomeric check valves are fabricated on a common cuff, said cuff connected to a corresponding diffuser end on one of said coupling devices.

11. The diffuser system of claim 9 wherein said elastomeric check valves each have at least one internal orifice extending longitudinally from said internal cavity into said fluid outlet bill end.

12. The diffuser system of claim 9 wherein said coupling device is a restrictive orifice.

13. The diffuser system of claim 9 wherein said coupling device is a "Y"-shaped conduit.

14. The diffuser system of claim 9 wherein said coupling device is a conduit nipple.

15. The diffuser system of claim 9 wherein said fluid is air.

16. The diffuser system of claim 9 wherein said elastomeric check valves are made of rubber.

17. The diffuser system of claim 9 wherein said elastomeric check valves are made of reinforced rubber.

18. A diffuser system comprising:

a manifold having a plurality of openings;

a fluid inlet fitting on said manifold;

a plurality of coupling devices selected from a group consisting of a "Y"-shaped conduit, a restrictive orifice, and a conduit nipple, each coupling device connected to one of said openings on said manifold; and a plurality of elastomeric check valves, each valve having a molded body, said body having a fluid outlet bill end, a fluid inlet end, and a body wall forming an internal cavity extending from said fluid inlet end to said fluid outlet bill end, said fluid outlet bill end having at least one internal orifice extending longitudinally from said internal cavity into said fluid outlet bill end, said fluid inlet end connected to a corresponding opening on one of said coupling devices, with an increasing flow rate of said fluid exiting said fluid outlet bill end as fluid manifold pressure increases and a decreasing flow rate of said fluid exiting said fluid outlet bill end as fluid manifold pressure decreases.

19. The diffuser system of claim 18 wherein said fluid inlet ends are fabricated on a common cuff, said cuff connected to a corresponding diffuser end on one of said coupling devices.

20. The diffuser system of claim 18 wherein said elastomeric check valves are made of rubber.

\* \* \* \* \*

UNITED STATES PATENT AND TRADEMARK OFFICE
CERTIFICATE OF CORRECTION

PATENT NO. : 6,016,839
DATED : January 25, 2000
INVENTOR(S) : Spiros G. Raftis et al.

It is certified that error appears in the above-identified patent and that said Letters Patent is hereby corrected as shown below:

Title Page, under [56] References Cited, U.S. PATENT DOCUMENTS, insert:

```
--4,218,407  8/1980   Robertson...........261/064R
  4,492,253  1/1985   Raftis..............137/849
  4,585,031  4/1986   Raftis et al........137/846
  4,607,663  8/1986   Raftis et al........137/846
  4,923,166  5/1990   Raftis..............251/004
  5,215,123  6/1993   Raftis..............136/847
  5,282,314  2/1994   Raftis..............29/890.124
  5,597,491  1/1997   Winkler.............210/754
  5,606,995  3/1997   Raftis..............137/846--.
```

Title Page, under [56] References Cited, insert:
--FOREIGN PATENT DOCUMENTS
2,086,745  5/1982   United Kingdom
9,732,669  9/1997   WIPO--.

Column 4 Line 60, Claim 1, "pressure increase" should read --pressure increases--.

Signed and Sealed this

Fourteenth Day of November, 2000

Attest:

Q. TODD DICKINSON

*Attesting Officer*    *Director of Patents and Trademarks*